United States Patent
Cordeiro et al.

(10) Patent No.: US 9,137,805 B2
(45) Date of Patent: Sep. 15, 2015

(54) SPECTRUM MANAGEMENT IN DYNAMIC SPECTRUM ACCESS WIRELESS SYSTEMS

(75) Inventors: Carlos Cordeiro, Ossining, NY (US); Dagnachew Birru, Yorktown Heights, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1294 days.

(21) Appl. No.: 12/066,887

(22) PCT Filed: Sep. 14, 2006

(86) PCT No.: PCT/IB2006/053292
§ 371 (c)(1),
(2), (4) Date: Mar. 14, 2008

(87) PCT Pub. No.: WO2007/031958
PCT Pub. Date: Mar. 22, 2007

(65) Prior Publication Data
US 2008/0259859 A1 Oct. 23, 2008

Related U.S. Application Data

(60) Provisional application No. 60/718,127, filed on Sep. 16, 2005, provisional application No. 60/733,503, filed on Nov. 4, 2005.

(51) Int. Cl.
*H04W 4/00* (2009.01)
*H04W 72/06* (2009.01)

(52) U.S. Cl.
CPC ..................................... *H04W 72/06* (2013.01)

(58) Field of Classification Search
CPC ............................ H04W 72/04; H04W 72/0413
USPC ................ 370/329, 330, 328, 341, 431, 437; 455/434, 450, 464, 509
See application file for complete search history.

(56) References Cited

U.S. PATENT DOCUMENTS

| | | | |
|---|---|---|---|
| 5,608,727 A * | 3/1997 | Perreault et al. | 370/462 |
| 2002/0090979 A1 | 7/2002 | Sydor | |
| 2003/0198200 A1 * | 10/2003 | Diener et al. | 370/329 |
| 2004/0028003 A1 | 2/2004 | Diener | |
| 2004/0213197 A1 * | 10/2004 | Zimmerman et al. | 370/346 |
| 2004/0218581 A1 * | 11/2004 | Cattaneo | 370/350 |
| 2004/0248568 A1 | 12/2004 | Lucidarme | |
| 2005/0083876 A1 * | 4/2005 | Vialen et al. | 370/328 |
| 2005/0250468 A1 * | 11/2005 | Lu et al. | 455/403 |
| 2005/0265303 A1 * | 12/2005 | Edwards et al. | 370/349 |

(Continued)

FOREIGN PATENT DOCUMENTS

EP 1473956 A2 11/2004

OTHER PUBLICATIONS

Internet Citation, "Functional Requirements for teh 802.22 WRAN Standards", Aug. 2005, XP002425031 URL:www.ieee802.org/22/Meeting_documents/2005_Aug_teleconferences/22-05-007-39-0000_RAN_Requirements.doc.

(Continued)

*Primary Examiner* — Brandon Renner
*Assistant Examiner* — Abdelnabi Musa
(74) *Attorney, Agent, or Firm* — Larry Liberchuk

(57) ABSTRACT

A plurality of MAC/PHY stacks is adapted to support wireless devices. A superframe structure includes a preamble and a superframe initialization header.

20 Claims, 4 Drawing Sheets

(56) References Cited

U.S. PATENT DOCUMENTS

2007/0026868 A1* 2/2007 Schulz et al. ............... 455/454
2008/0273493 A1* 11/2008 Fong ........................... 370/330
2009/0131014 A1* 5/2009 Mashinsky et al. .......... 455/405
2012/0314657 A1* 12/2012 Ode et al. .................... 370/328

OTHER PUBLICATIONS

S. Haykin, "Cognitive Radio: Brain-Empowered Wireless Communications", IEEE Journal on Selected Areas in Communications, IEEE Service Center, Piscataway, NJ, USA, vol. 23, No. 2, Feb. 2005, pp. 201-220, XP011126474.

L Berlemann et al., "Policy-Based Spectrum Navigation of Cognitive Radios in Open Spectrum", WWRF14, 14th meeting of the Wireless World Research Forum, San Diego, CA, Jul. 2005.

S. Mangold et al., "Spectrum Agile Radio: Radio Resource Measurements for Opportunistic Spectrum Usage", IEEE Communication Society, Globecom 2004, pp. 3467-3471.

* cited by examiner

SPECTRUM MANAGEMENT IN DYNAMIC SPECTRUM ACCESS WIRELESS SYSTEMS

CROSS-REFERENCE TO RELATED APPLICATIONS

The present application is related to concurrently filed and commonly assigned U.S. patent applications having Ser. Nos. 60/733,519, 60/733,504 and 60/733,520. The present application is also related to U.S. Provisional Patent Application Ser. No. 60/718,127, filed on Sep. 16, 2005.

Wireless communication technology has significantly advanced making the wireless medium a viable alternative to wired solutions. As such, the use of wireless connectivity in data and voice communications continues to increase. These devices include mobile telephones, portable computers in wireless networks (e.g., wireless local area networks (WLANS), stationary computers in wireless networks, portable handsets, to name only a few).

As wireless applications continue to grow, so do the numbers of devices, networks and systems vying for the communications spectrum. As is known, there are dedicated or licensed portions as well as unlicensed portions of the communications spectrum. Because the unlicensed bands of the spectrum (e.g., the industrial, scientific and medical (ISM) radio bands) may be accessed freely, these bands tend to be heavily populated by users. Contrastingly, recent studies indicate that only a small portion of the licensed band is being used. Thus, much of the unlicensed band is overcrowded, while a relatively large portion of the licensed band remains unused. This had lead regulatory bodies (e.g., the Federal Communications Commission (FCC) of the U.S.) to an evaluation of current communication band allocations and their use.

One option for reallocation of the communications band involves the use of wireless networks adapted to dynamically access the communications spectrum. For example, dynamic spectrum access (DSA) wireless networks may be implemented in dedicated (licensed) portions of the communications spectrum. Illustratively, DSA wireless networks may operate in a spectrum normally dedicated for television transmission and reception. Thereby, certain portions of the communications band may be more fully utilized.

With the reallocation of certain communication bands for use by unlicensed (secondary) users, spectrum management is needed to ensure that licensed (primary or incumbent) users with priority access to the band are provided this access in an unfettered manner. For example, regulatory bodies (e.g., the FCC) may require that a secondary user vacate a channel in a relatively short period of time after an incumbent user begins occupation of the channel. Therefore, the medium access control (MAC) layer and physical (PHY) layer specifications must include provisions directed to this needed spectrum management.

Often, the channels available for use by secondary wireless station are not contiguous. Moreover, channel availability in DSA systems changes over time. Thus, not only are channels in a sub-spectrum not contiguous, but also, those channels that are available and those channels that are occupied by incumbent devices changes over time.

The dynamic and non-contiguous nature of the channels poses significant problems to the infrastructure of known DSA wireless systems. To this end, because the channels are not contiguous it is currently very challenging to provide a viable PHY layer that can support multiple non-contiguous channels. For example, because transmission is required in some channels and not in others, neighboring or nearby channels, sophisticated filtering is required. However, this type of selective filtering is problematic and is exacerbated due to the dynamic nature of the channel availability.

In addition to the difficulty of providing a PHY layer that can support multiple, dynamic, non-contiguous channels, known MAC layers are also ill-equipped to support the DSA wireless systems. For example, in known existing wireless systems, a BS will transmit a preamble over a number of channels. However, secondary devices make in-band measurements in a single channel and may not receive the preamble from the BS when this spans multiple channels. Thus, the STA may determine that the BS is not transmitting in its channel when in fact the BS is occupying the channel and other channels as well. As can be appreciated, this can reduce the efficiency of the wireless system as well as reduce the QoS of the wireless devices.

What is needed, therefore, is an apparatus and a method of wireless communication that overcomes at least the referenced shortcomings.

In accordance with an example embodiment, a wireless communication network includes a base station having a plurality of medium access control (MAC) and physical (PHY) layer stacks; and a spectrum manager adapted to assign each of the stacks to a respective one available restricted frequency channel or to a respective a set of contiguous available restricted frequency channels among at least one unavailable restricted frequency channel.

In accordance with another example embodiment, in a wireless communication system, a method of wireless communication includes providing a base station having a plurality of medium access control (MAC) and physical (PHY) layer stacks; and assigning each of the stacks to a respective one available restricted frequency channel or to a respective a set of contiguous available restricted frequency channels among at least one unavailable restricted frequency channel.

In a wireless communication system, a method of wireless communication includes transmitting a preamble field and a superframe initialization header (SIH) field in parallel to each of a plurality of restricted channels occupied by a base station; and synchronizing a secondary wireless station (STA) after receiving the preamble and SIH at the STA.

In yet another example embodiment, a data communication in a plurality of restricted channels includes a superframe having a preamble field and a superframe initialization header (SIH) field, wherein the SIH field includes information of the restricted channels occupied by a base station.

As used herein the term 'restricted frequency channel' or 'restricted channel' means a frequency channel dedicated for use by primary users. The restricted channels may be portions of the communications spectrum licensed by a regulatory body such as the FCC, or that are accessed on a priority basis by certain users. For example, the television channels in the United States are licensed frequency channels. However, certain device such as wireless microphones may access the network with priority over other users, even though the wireless microphones are not expressly licensed for use of the television spectrum. Thus, certain unlicensed channels that are restricted channels are contemplated as restricted channels. In addition, so-called licensed-exempt channels, which provide priority access to certain users, are also restricted channels.

As used herein, the terms 'a' and 'an' mean one or more; and the term 'plurality' means two or more.

The invention is best understood from the following detailed description when read with the accompanying drawing figures. It is emphasized that the various features are not necessarily drawn to scale. In fact, the dimensions may be arbitrarily increased or decreased for clarity of discussion.

Figure 1:
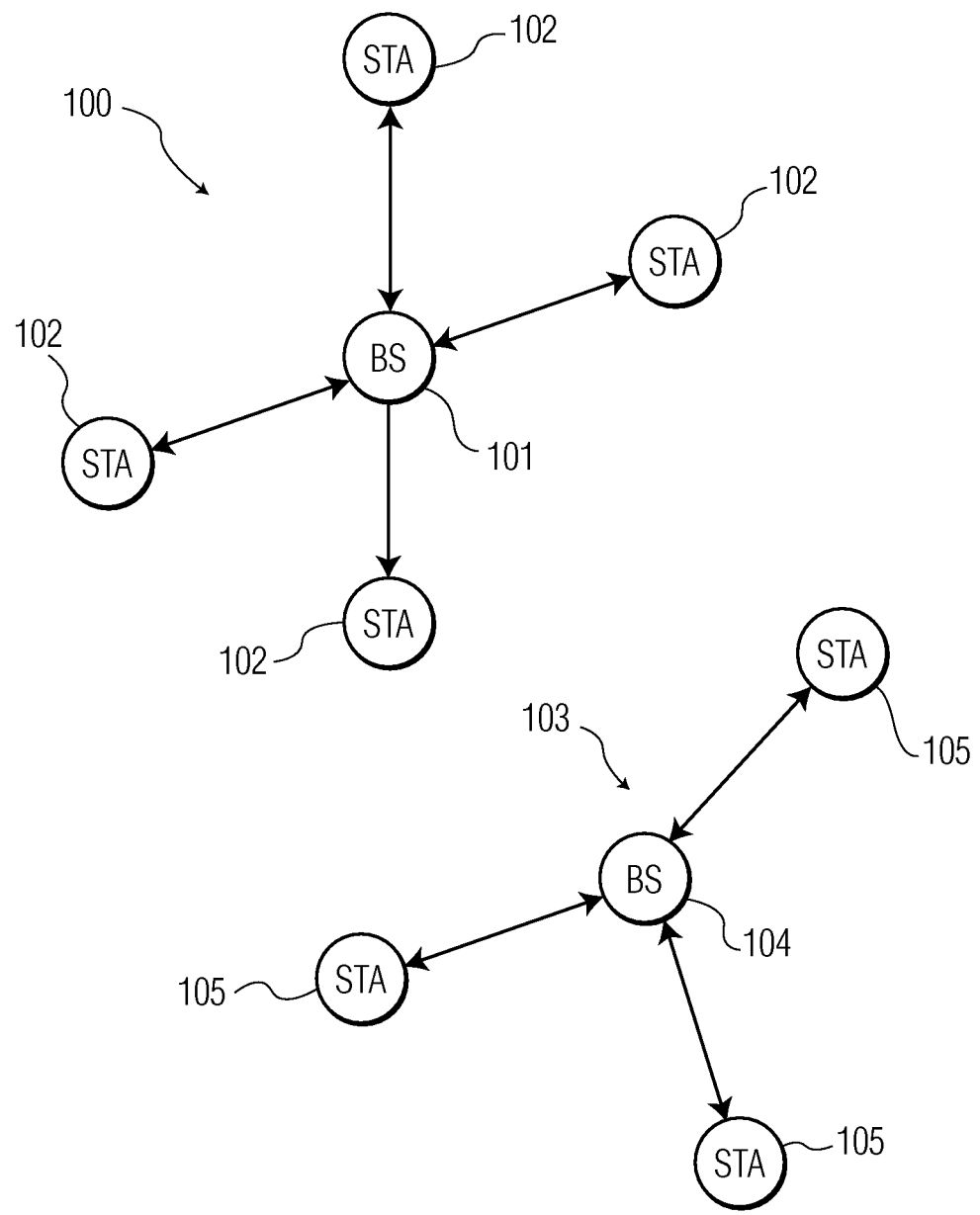
FIG. 1 is a simplified schematic diagram of a wireless communication system in accordance with an example embodiment.

In the following detailed description, for purposes of explanation and not limitation, example embodiments disclosing specific details are set forth in order to provide a thorough understanding of the present teachings. However, it will be apparent to one having ordinary skill in the art having had the benefit of the present disclosure that other embodiments that depart from the specific details disclosed herein. Moreover, descriptions of well-known devices, methods, systems and protocols may be omitted so as to not obscure the description of the example embodiments. Nonetheless, such devices, methods, systems and protocols that are within the purview of one of ordinary skill in the art may be used in accordance with the example embodiments. Finally, wherever practical, like reference numerals refer to like features.

It is noted that in the illustrative embodiments described herein, the network may be a wireless network with a centralized architecture or a decentralized architecture. Illustratively, the network may be one which functions under a DSA Medium Access (MAC) layer, such as to be defined under IEEE 802.22, or as defined under IEEE 802.16, IEEE 802.11, or as defined under IEEE 802.15. Moreover, the network may be a cellular network; a wireless local area network (WLAN); a wireless personal area network (WPAN); or a wireless regional area network (WRAN). Furthermore, the MAC protocol may be a time division multiple access (TDMA) protocol; a carrier sense multiple access (CSMA) protocol; a CSMA with collision avoidance (CSMA/CA) protocol; a Code Division Multiple Access (CDMA) protocol; or a frequency division multiple access (FDMA) protocol. It is emphasized that the noted networks and protocols are merely illustrative and that networks and protocols other than those specifically mentioned may be used without departing from the present teachings.

FIG. 1 is a simplified schematic view of a wireless network 100 in accordance with an illustrative embodiment. In a specific embodiment, the wireless network 100 is a centralized network. However, the present teachings may be generalized to a distributed wireless network.

The wireless network 100 includes an access point (AP) 101, which is also referred to as a base station (BS). The wireless network 100 further comprises a plurality of wireless stations (STAs) 102, which also may be referred to as wireless devices or as Customer Premise Equipment (CPE). Furthermore, there may be a neighboring wireless network 103 comprising a BS 104 and a plurality of STAs 105.

The neighboring wireless network 103 and its component devices are substantially identical to the system 100. In certain embodiments, as described in greater detail herein, the channel occupancy of the first network 100 and the channel occupancy of the second network 103 may result in non-contiguous channels' being available to one of the networks and thus, not to the other. Furthermore, occupation by incumbent devices may also result in non-contiguous channels' being unavailable to the networks 100, 103.

Illustratively, the wireless networks 100, 103 may be one of the types of networks noted previously. In general, the STAs 102, 105 are not necessarily the same. In fact, a plethora of different types of STAs adapted to function under the chosen protocol may be used within the network 100, 103. Moreover, the STAs 102, 105 may be computers, mobile telephones, personal digital assistants (PDA), or similar device that typically operates in such networks. In a specific embodiment, at least one of the STAs 102, 105 is stationary.

It is contemplated that the STAs 102 are adapted to function in restricted frequency channels of a frequency band that requires protection of incumbent users. As such, the base stations 101, 104 and the STAs 102, 105 are secondary devices and the networks 100, 103 are secondary networks. Often, for simplicity restricted frequency channels and restricted channels may be referred to as 'channels.'

It is noted that only a few STAs 102, 105 are shown; this is merely for simplicity of discussion. Clearly, many other STAs 102, 105 may be used. In addition, in the interest of simplicity of discussion, the description of the example embodiments will concentrate on the components of the wireless network 100. Of course, the details described will also apply to the network 103.

The DSA MAC/PHY layer methods and apparati of the example embodiments may be implemented in dynamic environments where the availability and quality of channels vary over time (e.g., new wireless technologies designed for the TV bands). Thus, the network of secondary STAs 102 of the example embodiments beneficially obtain channel availability in a dynamic manner; and beneficially notify other secondary STAs of the occupation or future occupation of a channel by an incumbent device. Accordingly, the DSA MAC layer methods and apparati of the illustrative embodiments provide spectrum access instructions to the secondary STAs 102. Beneficially, the spectrum access instructions foster unfettered use of restricted channels/bands by the incumbent devices and access to restricted channels/bands by the secondary STAs.

Figure 2:
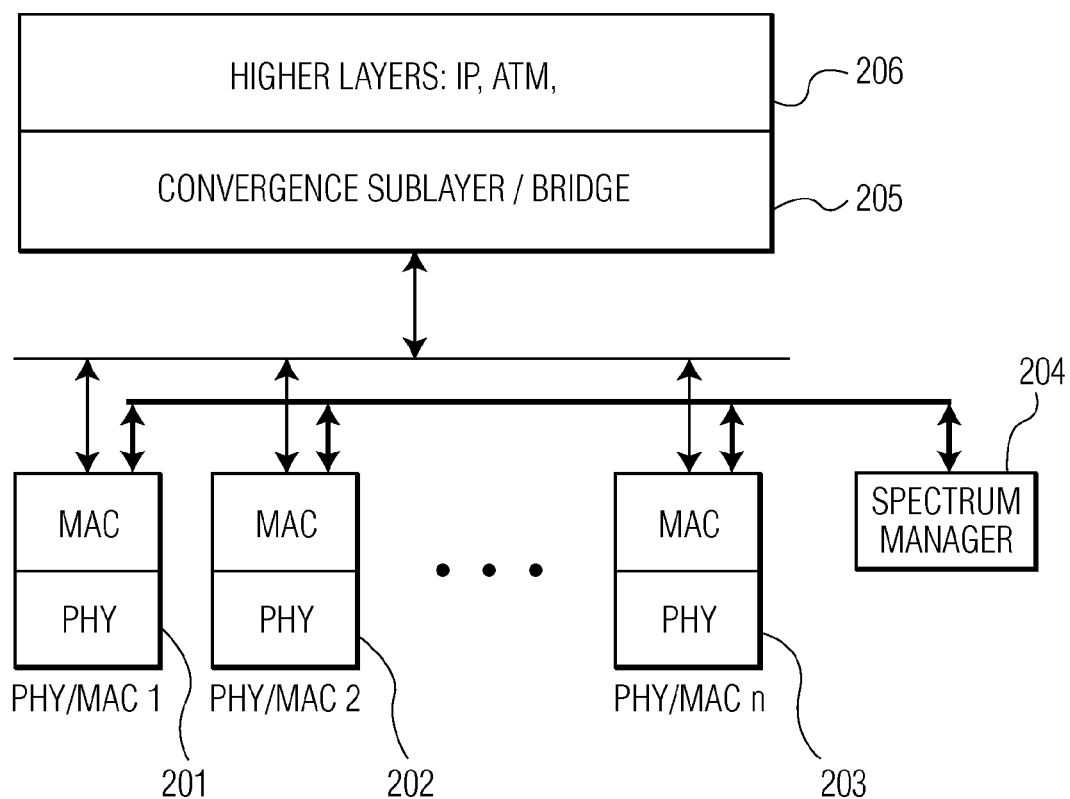
FIG. 2 is a simplified block diagram of architecture in a base station in accordance with an example embodiment.

FIG. 2 is a simplified block diagram of architecture 200 in accordance with an example embodiment. Illustratively, the architecture 200 is implemented in a base station (e.g., BS 101) of a DSA wireless system in accordance with an example embodiment. The architecture includes a plurality of MAC/PHY stacks 201, 202 and 203. In an example embodiment, there are n (n=positive integer) stacks. As described in greater detail herein, the number of stacks is not fixed and additional stacks may be added to accommodate more wireless STAs 102 in the network 100. Among other benefits, the scalability provided by the example embodiments fosters increased network capacity.

The stacks 201-203 are lower layers of the architecture 200 and support upper layers such as a convergence sublayer/bridge 205 and higher layers 206. Illustratively, the convergence sublayer/bridge 205 is as provided by IEEE 802.1d and the higher layers include an internet protocol (IP) layer, and an asynchronous transfer mode (ATM) layer, for example.

The plurality of stacks 201-203 are coupled to a spectrum manager 204. In a specific embodiment, the spectrum manager 204 may be implemented in a programmable logic device, or in custom hardware, or software, or a combination thereof. The implementation of the spectrum manager 204 may also be combined with the implementation of the other blocks of the architecture 200 using a single or multiple programmable devices, or customized hardware or software units, or a combination thereof.

Because incumbent devices/service must be protected from interference from the secondary STAs 102 operating in the network 100, the availability of channels for occupation by the secondary STAs 102 changes over time. To this end, as incumbent devices begin and terminate occupation of restricted channels in the wireless network 100, restricted channels become unavailable and become available, respectively, for occupation the secondary STAs 102. In order to protect the incumbent devices and provide service to the secondary STAs 102, the spectrum manager 204 of the example embodiments dynamically assigns the stacks 201-203 to respective groups of contiguous channels and indirectly assigns the stacks 201-203 to certain wireless STAs 102 occupying those channels.

Figure 3:
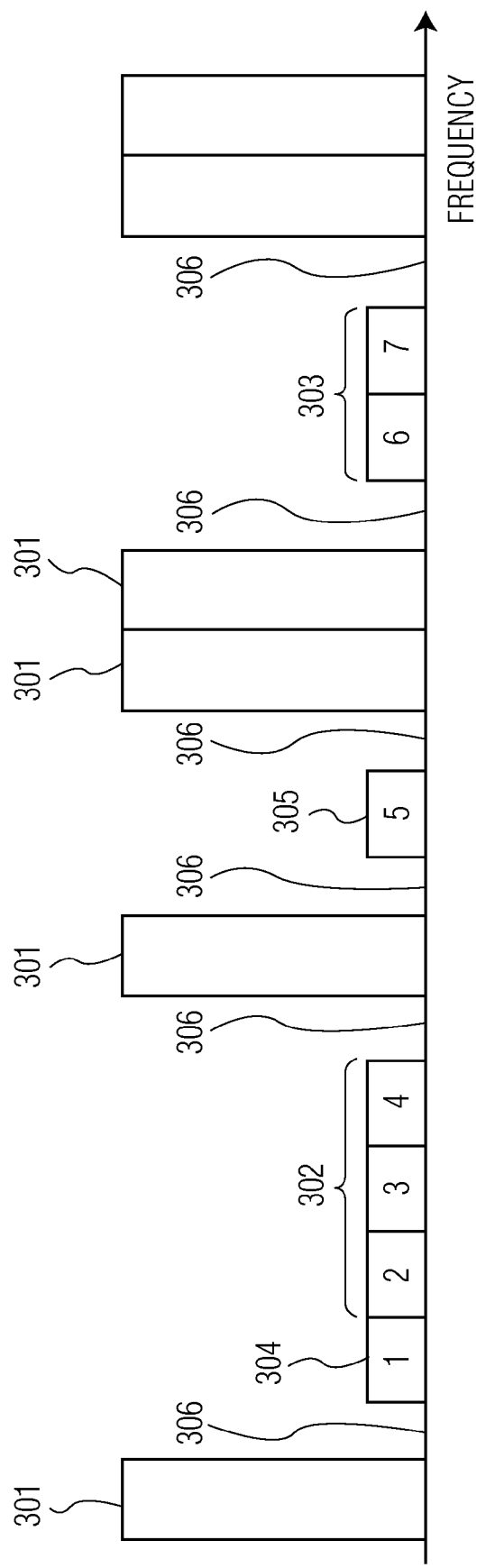
FIG. 3 is a representation of a portion of a spectrum of restricted frequency channels in accordance with an example embodiment.

FIG. 3 shows a portion of a shared spectrum of frequency channels in accordance with an example embodiment at a particular instant in time. Channels 301 are presently occupied by incumbent devices and are thus unavailable for occupation by the secondary STAs 102. Contiguous channels 302 (frequency channels 2-4) are allocated or assigned to MAC/PHY layer 201; and contiguous channels 303 (frequency channels 6-7) are allocated to MAC/PHY layer 202. Channel 304 (frequency channel 1) and channel 305 (frequency channel 5) are currently occupied by BS 104 and STAs 105 of the neighboring wireless network 103 in the present example. As such, in the current allocation channels 304, 305 are supported by another base station in a similar manner.

Notably, portions 306 of the frequency spectrum between a restricted channel occupied by a secondary STA 102, 105 and a restricted channel occupied by an incumbent device may remain unavailable or unused. These portions 306 between the channels in use by the secondary networks and those in use by the incumbent service usefully prevents signal crosstalk or overlap that can cause interference. The requirements of the spacing are often set by a regulatory body, such as the FCC.

In order for the channels to be allocated properly to respective MAC/PHY layers 201-203, the spectrum manager must garner information related to channel availability and information regarding the secondary STAs 102, 104. Based on this information the spectrum manager determines which MAC/PHY layers of the BS 101 to assign to respective contiguous channels.

In an example embodiment, data is garnered from in-band and out-of-band measurements by the STAs 102 by methods described in co-pending and cross-reference U.S. Patent Application Ser. No. 60/733,504 entitled "Notification of Incumbent Users in Dynamic Spectrum Access Wireless Systems," the disclosure of which is specifically incorporated herein by reference. From the measurements, the BS 101 can determine which channels are available for occupation by STAs 102 and which channels are not available.

Information is transferred between the spectrum manager and the plurality of MAC/PHY layers through a well-defined interface such as service primitives, application programming interfaces (API), or both. Information including, but not limited to: channel availability; the number of STAs 102 associated with each MAC/PHY layer 201-203; the traffic load in each of the MAC/PHY layers 201-203; the quality of service (QoS) required; and transmit power constraints in each MAC/PHY layers can be provided to the spectrum manager 204 and used by the spectrum manager 204 to allocate channels to respective MAC/PHY layers 201-203.

Along with information such as the channel availability, the spectrum manager 204 may assign channels to the various MAC/PHY stack based on several criteria. For example, the spectrum manager may take into account the number of STAs associated to each stack. In addition the spectrum manager may take into account the traffic requirements of the STAs. Based on these types of criteria, the spectrum manager 204 may assign more or fewer contiguous channels to a particular stack to ensure suitable capacity for the needs of the STAs 102. In addition, range information of the STAs may be taken into account in the allocation process. For example, lower frequency channels that have better propagation characteristics over distance could be assigned to the stack assigned to STAs 102 that are located at a greater distance from the BS 101.

The assignment of contiguous channels to a MAC/PHY stack is effected via algorithms within the spectrum manager. In addition to allocating the MAC/PHY stacks 201-203 to respective channels, the spectrum manager 204 algorithmically determines the allocation to foster efficient coexistence amongst the MAC/PHY stacks 201-203. For example, provided sufficient bandwidth is available via the channels, the spectrum manager 204 may assign the available channels in such a way as to minimize interference amongst the stacks. To wit, the assignment may substantially prevent co-channel assignment to a MAC/PHY and may substantially avoid adjacent channel assignment. Moreover, if the number of available channels is smaller than the number of stacks, spectrum manager 204 algorithmically allocates channels to the stacks for specified time intervals. To this end, the spectrum manager 204 may provide one MAC/PHY stack access a channel or set of contiguous channels for a set time in a communication frame, and provide another MAC/PHY stack access to the same channel or set of contiguous channels for another period of time in the frame. Beneficially, therefore, the spectrum manager 204 allows several MAC/PHY stacks to share a single frequency channel or set of contiguous channels in a time division manner. Of course, if special types of antenna systems (e.g., directional or beam forming antenna systems) are employed, the same set of frequency channels may be assigned to different MAC/PHY stacks, and interference protection is provided in space by the antenna system.

Among other benefits, the architecture 200 provides options for low complexity, higher capacity, and scalable implementations. The relatively low complexity is achieved by providing a user the option to select the number of MAC/PHY stacks that are needed to support the network. If a single stack system is selected, the need for the spectrum manager 204 is greatly simplified as all the resources can be freely used. More stacks can be included to increase capacity, and hence the role of the spectrum manager is useful in orchestrating the reuse of the spectrum amongst the various stacks. Accordingly, scalability is easily accommodated by this architecture by allowing multiple stacks to be progressively incorporated as demand increases and removed or deactivated as demand decreases.

Another aspect of the example embodiments of the present teachings includes informing the STAs 102 of the wireless network 100 of those restricted channels that are available. For example, an STA 102 may be dormant for a period of time and powers up during a frame. Because the BS 101 transmits in a plurality of channels, it may be difficult for the STA 102 to determine which channel(s) that the BS is occupying and therefore, which channels are available for use. Returning to FIG. 3, when the dormant STA 102 powers up and begins scanning channels for the BS 101, the STA will readily determine that the BS 101 is not occupying the restricted channels 301 in use by the incumbent devices; or the restricted channels 304, 305 occupied by the neighboring network 103. However, because the BS 101 is transmitting across more than one contiguous channel (e.g, a total of three channels 302 assigned to MAC/PHY stack 201 and two channels 303 assigned to MAC/PHY stack 202), the STA 102 may not be able to readily ascertain the occupation of the BS 101 in these channels. To this end, the BS 101 transmits preambles across multiple contiguous channels, while the STA 102 will always scan on a single channel basis. As, because the BS 101 transmits preambles across multiple contiguous channels, the STA 102 may not be able to detect the preamble and synchronize to it. Given the dynamics of the environments and the time varying availability of restricted channels, it is exceedingly difficult for an STA 102 to determine in advance how many contiguous channels are being used by a BS 101.

Figure 4:
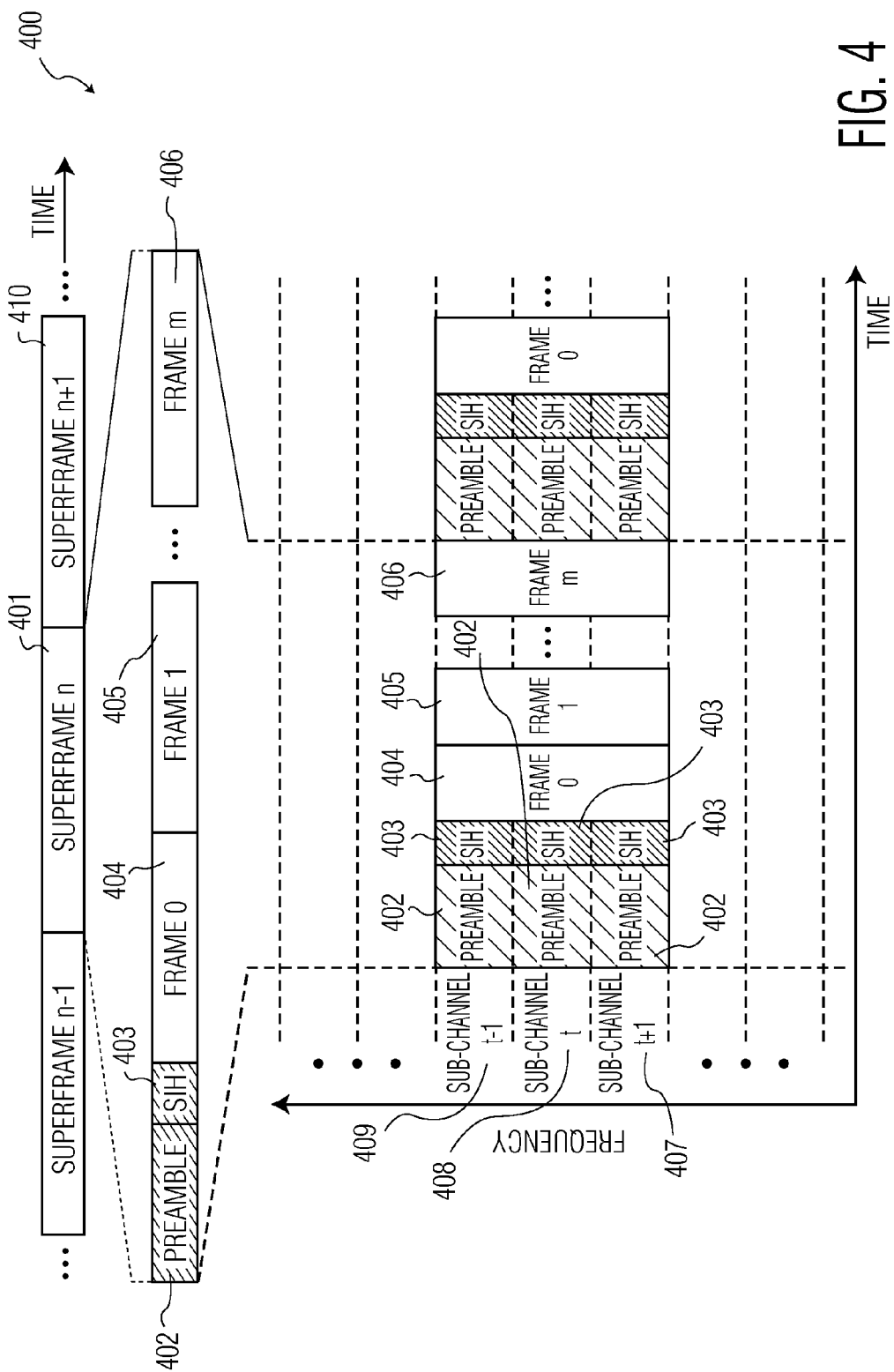
FIG. 4 is a representation of a superframe structure in accordance with an example embodiment.

To address this issue and ensure suitable notification of the occupation of the restricted channels by the BS 101, a superframe structure is provided according to an example embodiment. FIG. 4 shows a series of superframes 400 transmitted over time. The components of an $n^{th}$ superframe 401 are shown to illustrate the salient features of the superframe structure. Naturally, the other superframes include such features as well.

The superframe 401 includes a preamble 402 and a superframe initialization header (SIH) 403 as the first two fields in the superframe 401. The superframe also includes a plurality of frames 404, 405, 406 described in greater detail in the above-referenced applications.

In the example embodiments, the transmission scheme may be orthogonal frequency division multiplexing (OFDM). The superframe structure described presently includes a method based on OFDM that allows the BS 101 to establish communication with one of the STAs 102 in an environment characterized by time varying availability of the restricted channels. To this end, the preamble 402 and the SIH 403 are transmitted through a select few or all of the currently available restricted channels in use by the MAC/PHY stack(s) of the BS 101 in parallel. Stated differently, consider available restricted frequency channels 407, 408 and 409. The preamble 402 and SIH 403 are transmitted in each of these channels at the commencement of the superframe. Thereafter communications are carried out over the frames 404-406.

The transmission of the preamble 402 and the SIH 403 beneficially allows STAs 102 wanting to join the network 100 (e.g., by powering up or otherwise entering the network 100) efficiently. In particular, when an STA 102 powers up or otherwise enters the network, the STA 102 scans the channels searching for the BS 101. Because the preamble 402 and SIH 403 are transmitted in parallel to each channel in use by the BS 101 (e.g., channels 407-409) if the STA 102 receives the preamble 402 and SIH 403 through its scans of any one of the channels 407-409, the STA 102 joining the network will be apprised of multiple information including which channels are being occupied by the BS 101. Moreover, the preamble 402 and SIH 403 may include the information of which contiguous channels are being supported by a particular MAC/PHY stack.

After garnering the information on the channels in which the BS 101 is occupying, the STA 102 is able to synchronize to the network. This synchronization includes, but is not limited to adjusting the transmission and reception frequencies of the transmission and reception equipment (e.g., RF equipment) of the STA 102 to those of the available channels 407-409.

Among other information, the SIH 403 may include, but is not limited to: channels occupied by the BS 101; the number of frames per superframe; the duration of each frame; the next scheduled quiet period; the quiet period duration; the BS transmit power; the BS location information.

Notably, if an STA 102 attempts to join the network after the termination of the transmission of the SIH 403, the STA 102 will be unaware of the needed information regarding the network. This will require the STA 102 to remain quiet and continue to scan the communications spectrum. At the commencement of the next superframe (e.g., superframe 410), the preamble and SIH are again transmitted in parallel. At this point, the STA 102 may join the network 100.

As described previously and in the related applications noted above, the availability of restricted channels to secondary STAs 102 of the network 100 varies over time. Accordingly, while channels 407-409 are available at the beginning of the superframe 401, these channels may not be available in the next superframe 410, or may become unavailable during the superframe 401. As a result, the preamble 402 and SIH 403 are changed by the MAC/PHY layer(s) of the BS 101 dynamically to include those channels in which the BS 101 is occupying during the next superframe 410. Naturally, unavailable restricted channels (e.g., channels 301) may become available during the superframe 401 and the preamble 402 and SIH 403 will be updated to include this information if the BS 101 decides to occupy these channels.

According to example embodiments, contiguous channels among a spectrum of non-contiguous channels are assigned to respective MAC/PHY stacks 201-203. These contiguous channels are 'bonded' together for use by the STAs 102 of the network 100. The superframe structure of the example embodiments is useful in providing access by secondary STAs 102 to multiple restricted channels bonded together (e.g., TV channels). Illustratively, wireless networks 100, 103 of the example embodiments are adapted to operate in the VHF and/or UHF TV bands using the MAC/PHY stack assignment and superframes described. In the United States (and some other countries) where the TV channelization is 6 MHz, the superframe could be employed to efficiently bond 6 MHz (one channel), 12 MHz (two channels), and 18 MHz (three channels) and so on. Thus, the parallel communication of the preamble 402 and the SIH 403 fosters efficient use of the bonded channels to STAs 102 entering the network.

Beneficially, superframe structure of the example embodiments is adapted to allow STAs 102 to quickly associate with each other by dynamically controlling the frequency with which the preamble and SIH are transmitted. The more frequently the preamble and SIH are transmitted, the more quickly other stations can find the network. This improvement must be weighed against possible performance degradation created as the preamble and SIH must be transmitted in each channel.

In view of this disclosure it is noted that the various methods and devices described herein can be implemented in hardware and software. Further, the various methods and parameters are included by way of example only and not in any limiting sense. In view of this disclosure, those skilled in the art can implement the present teachings in determining their own techniques and needed equipment to effect these techniques, while remaining within the scope of the appended claims.

The invention claimed is:

1. A wireless communication network comprising:
    a base station having a plurality of medium access control (MAC) and physical (PHY) layer stacks; and
    a spectrum manager adapted to make restricted frequency channels, not occupied by a primary user, available to secondary users by assigning one available restricted frequency channel or a set of contiguous available restricted frequency channels among at least one unavailable frequency channel to each of the respective stacks, and each of the respective stacks being assigned for use by a secondary user;

wherein the restricted frequency channels are channels dedicated for use by primary users;
wherein when the number of available channels is smaller than the number of stacks, the spectrum manager is configured to allocate the available restricted frequency channel or the set of contiguous available restricted frequency channels to several stacks for specified time interval such that the stacks share the available restricted frequency channel or the set of contiguous available restricted frequency channels in a time division manner.

2. The wireless communication network as recited in claim 1, wherein the spectrum manager is adapted to reassign each of the stacks dynamically.

3. The wireless communication network as recited in claim 1, further comprising a plurality of secondary wireless stations (STAS) and at least one incumbent device adapted to occupy one or more of the available restricted frequency channels.

4. The wireless communication network as recited in claim 3, wherein the spectrum manager is adapted to determine an availability of the restricted channels for use by the plurality of secondary wireless stations (STAS) within the network.

5. The wireless communication network as recited in claim 3, wherein the spectrum manager is adapted to determine transmission requirements of the plurality of secondary wireless stations (STAS) within the network.

6. A method of wireless communication, comprising:
providing a base station having a plurality of medium access control (MAC) and physical (PHY) layer stacks; and
making restricted frequency channels, not occupied by a primary user, available to secondary users by assigning one available restricted frequency channel or a set of contiguous available restricted frequency channels among at least one unavailable frequency channel to each of the respective stacks, and each of the respective stacks being assigned for use by a secondary user;
wherein the restricted frequency channels are channels dedicated for use by primary users;
wherein when the number of available channels is smaller than the number of stacks, the method further comprises allocating the available restricted frequency channel or the set of contiguous available restricted frequency channels to several stacks for specified time interval such that the stacks share the available restricted frequency channel or the set of contiguous available restricted frequency channels in a time division manner.

7. The method as recited in claim 6, further comprising, before the assigning, determining availability of the restricted channels for use by secondary wireless stations (STAS) within the network.

8. The method as recited in claim 6, further comprising, before the assigning, determining transmission requirements of secondary wireless stations (STAS) within the network.

9. The method as recited in claim 8, wherein the determining further comprises determining respective locations of the STAS and selecting an appropriate restricted frequency channel or an appropriate set of contiguous channels from the available restricted frequency channels based on the locations.

10. The method as recited in claim 6, further comprising, after the assigning, altering the assignment of the stacks to the available restricted frequency channels in response to changes in availability, or needs of the STAS, or both.

11. A method of wireless communication, comprising:
making restricted frequency channels, not occupied by a primary user, available to secondary users by transmitting a preamble field and a superframe initialization header (SIH) field in parallel to each of a plurality of restricted channels occupied by a base station; and
synchronizing a secondary wireless station (STA) after receiving the preamble and SIH at the STA;
wherein the restricted frequency channels are channels dedicated for use by primary users;
wherein when the number of available channels is smaller than the number of stacks, the method further comprises allocating the available restricted frequency channel or the set of contiguous available restricted frequency channels to several MAC/PHY stacks for specified time interval such that the stacks share the available restricted frequency channel or the set of contiguous available restricted frequency channels in a time division manner.

12. The method as recited in claim 11, wherein the transmitting occurs at a beginning of a superframe.

13. The method as recited in claim 11, wherein the synchronizing further comprises altering a transmission and a reception characteristic of the STA after the receiving.

14. The method as recited in claim 12, further comprising:
updating the SIH field prior to a next superframe; and
transmitting the preamble and updated SIH field in the next superframe.

15. The method as recited in claim 11, wherein the receiving further comprises scanning at least one of the plurality of restricted channels.

16. The method as recited in claim 12, wherein the superframe comprises a plurality of frames.

17. The method as recited in claim 11, wherein the SIH includes one or more of: a number of frames per superframe; a duration of each frame; a next scheduled quiet period; a quiet period duration; a sender transmit power; a sender location information.

18. A non-transitory storage medium embedded with data for communication, the data comprising:
a superframe having a preamble field and a superframe initialization header (SIH) field, wherein a plurality of restricted channels not occupied by a primary user that are made available for use by a secondary user, wherein the SIH field includes information of the restricted channels occupied by a base station;
wherein the restricted frequency channels are channels dedicated for use by primary users;
wherein when the number of available channels is smaller than the number of stacks, the available restricted frequency channel or the set of contiguous available restricted frequency channels are allocated to several MAC/PHY stacks for specified time interval such that the stacks share the available restricted frequency channel or the set of contiguous available restricted frequency channels in a time division manner.

19. The non-transitory storage medium as recited in claim 18, wherein the SIH further includes one or more of: a number of frames per superframe; a duration of each frame; a next scheduled quiet period; a quiet period duration; a sender transmit power; a sender location information.

20. The non-transitory storage medium as recited in claim 18, wherein the restricted channels further comprises a set of available restricted contiguous channels, wherein the set of contiguous channels is separated from another available restricted channel or another set of contiguous available restricted channels by an unavailable restricted channel or channels.

* * * * *